United States Patent [19]
Limozin et al.

[11] 4,163,587
[45] Aug. 7, 1979

[54] PNEUMATIC RAILWAY BRAKING DISTRIBUTOR

[75] Inventors: Henri Limozin, Claye Souilly; Georges Dalibout, Gagny, both of France

[73] Assignee: WABCO Westinghouse, Freinville-Sevran, France

[21] Appl. No.: 858,489

[22] Filed: Dec. 8, 1977

[51] Int. Cl.² .............................................. B60T 8/18
[52] U.S. Cl. .................................. 303/22 R; 303/64; 303/80; 303/81
[58] Field of Search ..................... 303/81, 22 R, 23 R, 303/69, 80, 82, 27, 37, 28, 22 A, 23 A, 64

[56] References Cited

U.S. PATENT DOCUMENTS

| | | | |
|---|---|---|---|
| 2,785,932 | 3/1957 | Cook | 303/64 |
| 3,639,010 | 2/1972 | Mayer | 303/22 A |
| 4,025,126 | 5/1977 | Wilson | 303/80 |

Primary Examiner—Trygve M. Blix
Assistant Examiner—Reinhard J. Eisenzopf
Attorney, Agent, or Firm—R. W. McIntire, Jr.

[57] ABSTRACT

A brake cylinder fluid pressure distributor having a control valve device of the pressure proportioning type that includes a main and auxiliary reaction piston, each subject on a corresponding face to pressure delivered by the control valve device to the brake cylinders in order to provide an actuating force on the piston valve assembly in a counteracting direction to the control force thereon, thereby automatically regulating the brake cylinder pressure. The auxiliary reacting piston is arranged on the piston valve assembly so as to be either engaged therewith or disengaged therefrom according to the effective load condition, speed range, deceleration rate or other parameter of a vehicle to be braked, thereby adjusting the effective brake cylinder pressure by adjusting the point in time when the delivery of pressure to the brake cylinders is terminated by the regulating action of the control valve device. Additional improvements include a segmented differential control piston via which the control force is transmitted to the piston assembly according to the variation of brake pipe pressure acting on one side of the control piston in opposition to a constant reference pressure on the other side. When the control force differential exceeds a predetermined level, corresponding to an emergency brake application, for example, one member of the segmented control piston is withheld from engagement with the other member such that only the reference pressure acts on the control piston to provide a constant control force on the piston assembly.

13 Claims, 5 Drawing Figures

PNEUMATIC RAILWAY BRAKING DISTRIBUTOR

BACKGROUND OF THE INVENTION

The present invention is related to pneumatic distributors for the control of railway vehicle brakes and particularly to such distributors as operate on the pressure proportioning principle popularized in Europe, as opposed to the pressure equalization principle on which operation of conventional triple valves used for freight service in this country is based.

Pneumatic distributors of the pressure proportioning type are commonly referred to as being self-lapping in operation in that a differential control force on the control piston abutment of the piston valve assemblage urging movement of the assemblage to a position opening its supply valve is in turn counteracted by the delivery pressure via the supply valve acting on a reaction piston abutment of the assemblage to urge movement back to close the supply valve when the force balance is reestablished.

SUMMARY OF THE INVENTION

An object of the present invention is to modify the piston valve assemblage of a proportioning type pneumatic distributor to compensate for a parameter, such as a given load or speed condition.

Another object is to incorporate a pressure limiting function into the conventional piston valve assemblage.

Yet another object is that of adjusting the brake pressure buildup and release times in accordance with the sensed parameter.

In meeting these objectives, the valve stem of a conventional, self-lapping type piston valve assemblage is arranged with an auxiliary reaction piston abutment that acts through the piston stem in concert with the main reaction piston abutment to counteract the control force imposed on the assemblage by the control piston abutment. The auxiliary reaction piston abutment is axially movable on the stem, which is provided with a stop member with which the auxiliary piston is engageable in response to brake cylinder pressure acting thereon to urge the piston assemblage from its application position toward a lap position. Valve means sensitive to a given parameter such as vehicle load or speed controls the supply of a correction pressure to the auxiliary reaction piston in opposition to the brake cylinder pressure. The correction pressure may be proportional to the sensed load or speed, or may be provided at a given value.

In order to limit the maximum brake cylinder pressure capable of being delivered to the brake cylinders, the control piston abutment is constructed with a flange protruding from the piston stem and a differential area piston concentric with the flange and axially movable on the stem. The control piston is subject to brake pipe pressure on one side and a control pressure on the opposite side that is charged from the brake pipe and maintained constant as a reference pressure against which variations in brake pipe pressure are measured. When a brake pipe pressure reduction occurs incident to producing the maximum desired brake cylinder pressure, the force across the differential area piston is reversed so that the piston is held against a stop and thereby out of engagement with the flange of the piston stem, which is accordingly subject only to the force provided by the constant control pressure acting on the effective area of the flange.

In addition to these improvements to the piston valve assemblage of the distributor, there is further provided, in different embodiments of the invention, valve devices for adjusting the buildup and release of brake cylinder pressure under different operating conditions.

BRIEF DESCRIPTION OF THE DRAWINGS

Other objects, advantages and aims will appear in the following more detailed description of the invention when considered in conjunction with the appended drawings in which.

DESCRIPTION AND OPERATION

Figure 1:
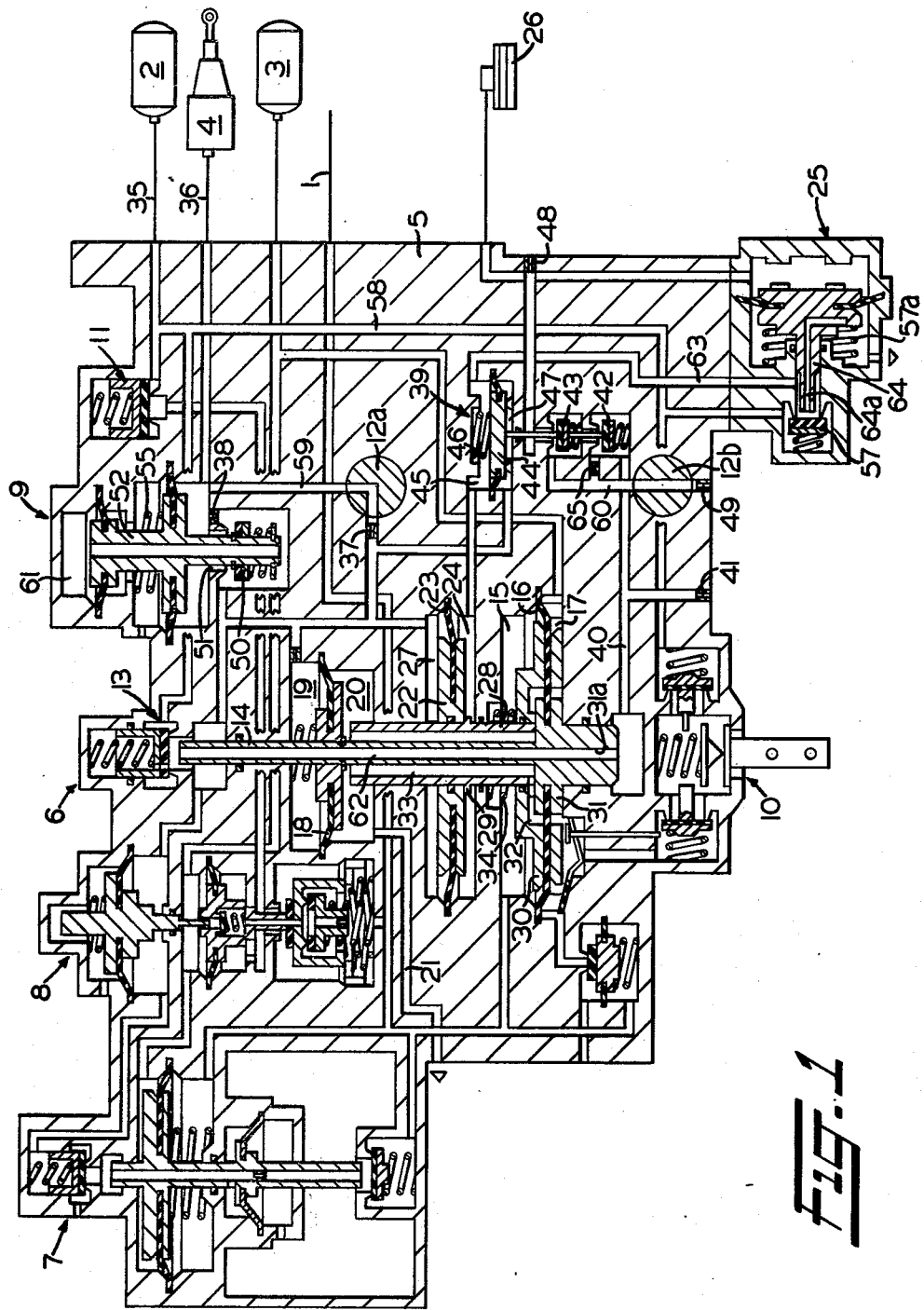
FIG. 1 is a diagrammatic showing a pneumatic railway braking distributor according to the invention, with the piston valve assemblage under one condition of a parameter, such as an "empty" vehicle.

The distributor represented is connected on each railway car in the usual manner to a brake pipe 1, to an auxiliary reservoir 2, to a control reservoir 3, and to the brake cylinders 4, of which only one is shown.

The following are provided for in the distributor body 5: a self-lapping control valve device 6, a quick service device 7 for accelerating the application of the brake, a charging valve 8 for the auxiliary reservoir 2 and the control reservoir 3, a brake cylinder inshot valve 9, a manual release valve 10 for dumping air from the brake cylinders and reservoirs when a car is set-off from the train, a check valve 11 protecting the auxiliary reservoir 2, and a two-way "freight-passenger" cock 12a and 12b.

Figure 2:
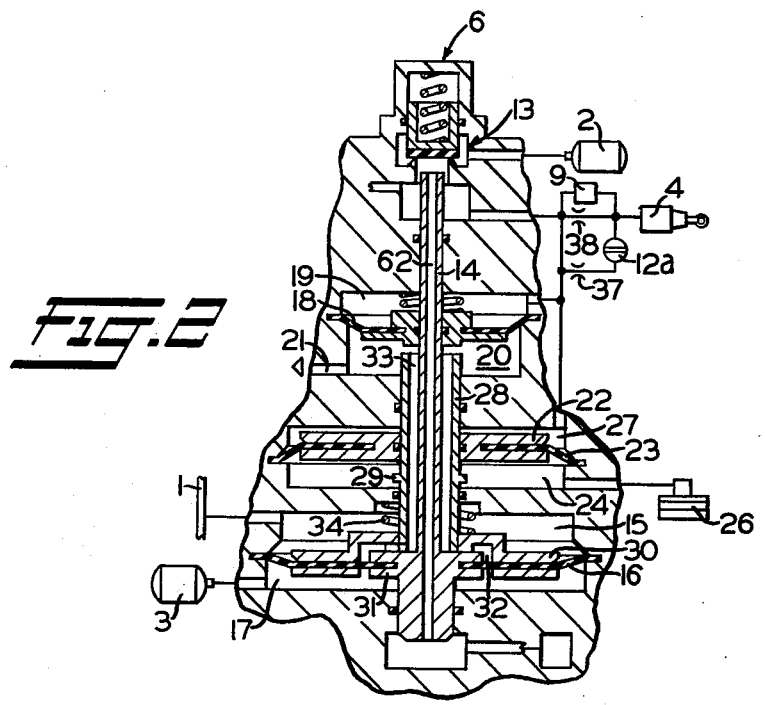
FIG. 2 is a partial diagrammatic of the distributor showing the piston valve assemblage under "load" conditions.

The control valve device 6 (FIGS. 1 and 2) includes a supply/exhaust valve assembly 13, and a diaphragm piston assembly consisting of an axially movable hollow shaft 14, the latter serving to engage and lift a seal element of the supply/exhaust valve assembly 13 off its seat when a decrease in the pressure of the brake pipe 1 occurs. This brake pipe pressure is effective in a chamber 15 formed by a main control piston abutment 16, where it acts in opposition to the fixed pressure of control reservoir 3 acting in a chamber 17 formed on the opposite side of control piston 16. The control valve device 6 also includes a main reacting diaphragm piston abutment 18, the surface of which is smaller than that of control piston 16. Diaphragm 18 is acted upon in the direction from top to bottom in FIGS. 1 and 2 by the pressure prevailing in a chamber 19, such pressure representing brake cylinder pressure as supplied directly from the supply/exhaust valve assembly 13, with chamber 20 opposed to chamber 19 being connected to atmosphere by conduit 21. An abutment 22 is connected to the body by an auxiliary reacting diaphragm 23, subject on its under side to the correcting pressure in a chamber 24. This correcting pressure assumes different values depending upon the "loaded" range and the "empty" range of the vehicle as detected by an empty/load control valve 25 to which a weight adjusted pressure supplied by an air spring or other conventional weighing component 26 is connected (FIG. 1); this pressure can also be a continuous function of the load as represented in FIG. 2 by the direct connection of the weighing component 26 to chamber 24.

The pressure supplied by the supply/exhaust valve assembly 13 prevails in the chamber 27 opposed to chamber 24. Abutment 22 slides axially, in an air-tight manner, on an exterior tube 28 surrounding shaft 14 and is mounted in such a way as to be axially movable within the body 5. The axial movement of abutment 22 with respect to tube 28 is limited in a downward direction by a shoulder 29 on the aforementioned tube 28, so that diaphragm 23 and abutment 22 constitute an auxiliary reaction piston component only in the "empty" range in the case of FIG. 1, or, in the case of FIG. 2, for all of the terminal phases of a brake application.

The main control piston abutment of the diaphragm piston assembly includes a pressure limiter consisting of a large-area flange 30 concentric to a smaller disc 31. Flange 30 slides in an air-tight manner axially on tube 28, whereas disc 31 slides axially in the body. Shaft 14 is mounted coaxially at its lower end in a central bore 31a of the disc 31. Chamber 32, defined by flange 30 and disc 31, is permanently connected to the atmosphere via the annular opening 33 between shaft 14 and tube 28, and thence via chamber 20 and conduit 21. Flange 30 is forced at the end of its travel into engagement with disc 31 by a spring 34, thus, for a certain threshold of pressure differential between the brake pipe 1 and the control reservoir 3, flange 30 is held in its uppermost position against the body, after having compressed spring 34. Consequently, disc 31 is subject to only the force of control reservoir pressure so as to effect a constant force on the piston assembly regardless of how high the pressure differential on control piston 16 is above the threshold under consideration.

It will be noted at this point that conduit 35 linking auxiliary reservoir 2 to the control valve device 6 is absent of a choke. On the other hand, on conduit 36, linking the control valve device 6 to the brake cylinders 4, there is a single choke 37, and in parallel to this and to the inshot valve 9 there is another choke 38. The functioning of these chokes 37 and 38, and of the inshot valve 9 will be explained below, but it might be noted here that choke 38 alone is active in the "freight" range (FIG. 2) after the inshot phase, because for this range cock 12a situated downstream of choke 37 (or including this choke 37) is closed, whereas in the "passenger" range cock 12a is open, as represented in FIG. 1, so that pressure is supplied to the brake cylinders 4 at a faster rate during application, via both chokes 37 and 38 in parallel.

Figure 4:
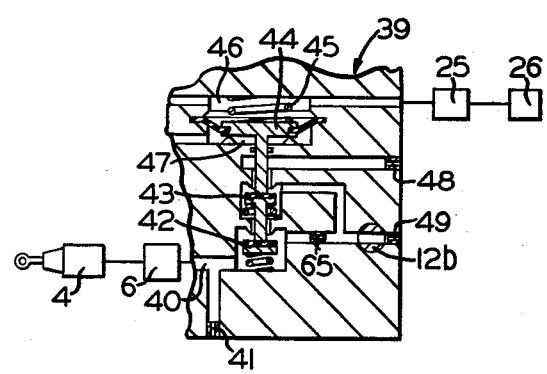

A release control adjustment device 39 (FIGS. 1 and 4) is located in release conduit 40 of the control valve device 6 and serves to control the release range of this conduit.

Conduit 40 is permanently connected to the atmosphere by a choke 41. The adjustment control device 39 consists of a double valve 42 and 43 connected with piston 44, which is acted upon in the direction of opening of the double valve 42, 43 by a spring 46 and by the pressure varying with the vehicle load supplied to chamber 45 by the empty/load control valve 25, and which is acted upon in the direction of closing of the double valve 42, 43 by the brake cylinder pressure supplied by the supply/exhaust valve assembly 13 to chamber 47 opposed to chamber 45 via a pressure tapped upstream of choke 37. Spring 46 is calculated to re-open double valve 42, 43 at a predetermined minimum brake cylinder pressure. In particular, one can thus effect a rapid blow-off of the brake cylinders on release even in the "empty" range.

In the "loaded" range, conduit 40 is connected to the atmosphere, in "freight" position only via chokes 41 and 48, which are operative by virtue of the opening of valve 43, and in "passenger" position (FIG. 4) by chokes 41, 48 and 49, the latter being placed in operation by the opening of double valve 42, 43 and of the element 12b of the cock 12b.

Figure 3:
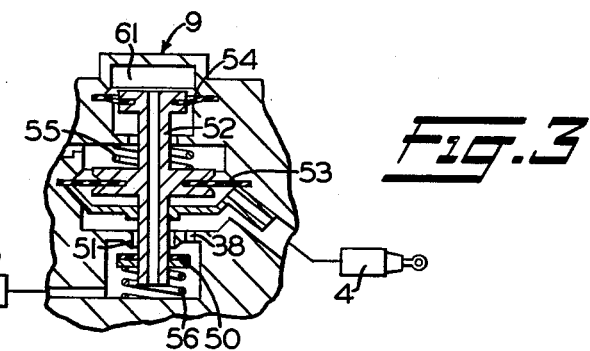
FIGS. 3 and 4 are partial diagrammatics showing, respectively, an inshot valve device and a brake release control device of the pneumatic distributor.

The inshot valve 9 (FIGS. 1 and 3) controls a valve 50 that controls a large cross-section passage 51 situated in parallel with choke 38. Valve 9 consists of an assembly 52 composed, on the one hand, as is well known, of a diaphragm 53 acted upon in the direction of closure of valve 50 by the pressure prevailing downstream of choke 38, and, on the other hand, according to the invention, of a second diaphragm 54 acted upon in the direction of closure of valve 50 by the pressure prevailing upstream of choke 38, as supplied via supply/exhaust valve assembly 13. A spring 55 forces assembly 52 of valve 9 downward, that is, in the direction of opening of valve 50; the latter, finally, is acted upon in a closing direction by return spring 56.

The distributor of FIG. 1 operates in a manner that will be made clear in accordance with the following description:

I—LOADED VEHICLE "FREIGHT" RANGE

We shall suppose initially that the freight vehicle is "loaded", that is to say, that the weighing component 26 supplies sufficient pressure to cause opening of a double valve 57 of the empty/load control valve 25, in opposition to a prestressed spring 57a. The correcting pressure from the auxiliary reservoir 2 thus arrives via conduit 35 and branch 58 at the open valve 25, and thus at the release-control adjustment device 39 and at chamber 24 associated with abutment 22 and diaphragm 23 of the control valve device 6.

The "freight" range is established by positioning the cock 12a so as to block conduit 59 having choke 37 and to close conduit 60 connecting brake cylinder pressure to the atmosphere by means of the cock 12b.

At rest or in normal movement, abutment 22 of control valve device 6 is thus pushed upward against the body by the correcting pressure prevailing in chamber 24, such pressure originating in auxiliary reservoir 2.

Application

When the operator orders a gradual application of the brake, the pressure of the brake pipe 1 is accordingly reduced in a known manner, while the pressure in control reservoir 3 remains constant. Accordingly, flange 30 and disc 31 transmit an upward force to tube 14 of the piston assembly, which then closes the exhaust valve and opens the supply valve of the supply/exhaust valve assembly 13.

The compressed air flows from auxiliary reservoir 2 via conduit 35 and the open supply valve of control valve device 6 to:
 (a) the brake cylinders 4 via the large cross-section passage 51, which is opened by valve 50 of the inshot valve 9;
 (b) to chambers 19 and 27, where it flows unrestricted to exert a downward force on both the main reaction piston abutment 18 and auxiliary reaction piston abutment;

Simultaneously, the pressure supplied by control valve device 6 is transmitted to:

(c) chamber 61 of inshot valve 9 to urge movement of valve 50 to its open position; and (d) chamber 47 of release control valve 39 to effect closure of valves 42 and 43.

The control of the opening of valve 50 by placing chamber 61 under pressure—in cooperation with the action of spring 55—guarantees an initial phase during which the brake cylinders are filled with air at a higher flow-rate than during the following phase.

The pressure directed to chamber 47 is ineffective during application as well as during release of the brakes, since it acts on a smaller surface than that of chamber 46, which is subject to the pressure of auxiliary reservoir 2 supplied via empty/load control valve 25 in the loaded car condition.

When the pressure in chamber 19, which reflects the effective brake cylinder pressure, builds up sufficiently to counterbalance the brake pipe reduction, a downward force is exerted on tube 14, thereby effecting closure of the supply valve to accordingly terminate the brake application by the well known self-lapping action of control valve device 6.

Further reductions in brake pipe pressure will, in the same manner, produce proportionately higher levels of brake cylinder pressure.

In the event the operator orders a full or emergency brake application, the pressure limiter 30 to 34 of control valve device 6 intervenes and limits to a given value the increasing force exerted on assembly 14. The result is that the pressure supplied by control valve device 6, although a function of the load of the vehicle, is practically independent of the pressure prevailing in the auxiliary tank 2.

Release

To effect a release of the brake, the operator causes an increase in the pressure of brake pipe 1 to unbalance the forces on the piston assembly to effect movement of tube 14 downwardly to open the exhaust valve, while the supply valve of the valve assembly remains closed. The compressed air that was contained in the brake cylinders 4 thus passes via conduit 36, control valve device 6, and the central passage 62 of shaft 14 to conduit 40, and from there to the atmosphere via choke 41, and open valve 42, 43 of release control valve 39 and thence via choke 48.

II—LOADED VEHICLE, "PASSENGER" RANGE

To modify the distributor for "passenger" type service, cocks 12a and 12b are positioned, as shown in FIG. 1, to respectively open conduit 59 containing choke 37 and conduit 60 issuing to the atmosphere via choke 49.

Application

The pressure supplied by valve assembly 13 of control valve device 6 is transmitted unrestricted via the passage 51 and open valve 50, and via choke 38 in parallel with parallel with passage 51 until the pressure is reached that causes assembly 52 of inshot valve 9 to effect closure of valve 50; this pressure is transmitted as well, whatever its value, through choke 37 of conduit 59. It might be observed that choke 37 can be placed anywhere in conduit 59, including cock 12a.

Release

The compressed air in the brake cylinders 4 is released as in the preceding case via chokes 41 and 48, as well as choke 49, which is now also in the exhaust circuit to permit a more rapid release of brake cylinder pressure.

III—EMPTY VEHICLE, "FREIGHT" RANGE

Cocks 12a and 12b are positioned to interrupt passageways 59 and 60.

The pneumatic pressure supplied by the weighing component 26 in an empty-car condition is insufficient to actuate load control valve 25. Chamber 24 adjacent to movable abutment 22 and chamber 46 of the adjustment valve 39 are thus connected to atmosphere via conduit 63 and a passage 64a inside tube 64 of load control valve 25.

Application

The pressure supplied via control valve device 6 when the piston assembly has detected a sufficient pressure differential between the brake pipe 1 and control reservoir 3 now acts simultaneously upon the main reacting diaphragm piston abutment 18 and the auxiliary reacting diaphragm piston abutment 23, whose abutment 22 now forces the piston assembly downward by its contact against shoulder 29 of tube 28. Thus, for a given pressure drop in the brake pipe 1, the pressure supplied by control valve device 6 is stabilized at a much lower value than in "loaded" range.

Release

Since atmospheric pressure prevails in chamber 45, as soon as the brake cylinder pressure supplied by control valve device 6 exceeds a value determined by spring 46, piston 44 is raised and the double valve 42, 43 is forced to the closed position by the return springs, thereby establishing passageway 40 as the lone path via which the brake cylinders 4 may be subsequently released of fluid pressure via choke 41.

IV—EMPTY VEHICLE, "PASSENGER" RANGE

Application

The pressure supplied by control valve device 6 is exerted, as in the preceding case, on both the main reacting piston abutment 18 and the auxiliary reacting piston abutment 23. Chokes 37 and 38 are chosen to regulate the filling of the brake cylinders in the required time after the initial phase of inshot control, since cock 12a opens passage 59.

Release

With the double valve 42, 43 still closed, but with cock 12b open, the release of release of pressure from the brake cylinders 4 takes place simultaneously via parallel chokes 41 and 65.

Since choke 49 is placed in series with choke 65 and offers a larger opening than the aforesaid choke, it no longer intervenes in the determination of the release flow-rate.

The distributor described operates in two ranges according to the load of the vehicle. The magnitude determining the range could, of course, be either the speed or the deceleration of the vehicle, as well as the vehicle load, in which case the load control valve would be replaced, for example, by an electrically-actuated valve receiving an electrical signal, for example, as a function of speed. The discontinuous operation described above is not restrictive, and one could, without difficulty, obtain a continuous mode of operation by the transfer of a regulated pressure that varies continuously with the load. The curve of the supplied pressure as a function of time thus has a knee in it; it actually consists of a steep initial part corresponding to the "loaded" range by virtue of the fact that abutment 22 is inactive, being forced out of engagement with shoulder 29, and then there follows a less-steeply-sloped section by virtue of the fact that abutment 22 engages shoulder 29 when the effective brake cylinder pressure in chamber 27 exceeds the correction pressure in chamber 24.

Figure 5:
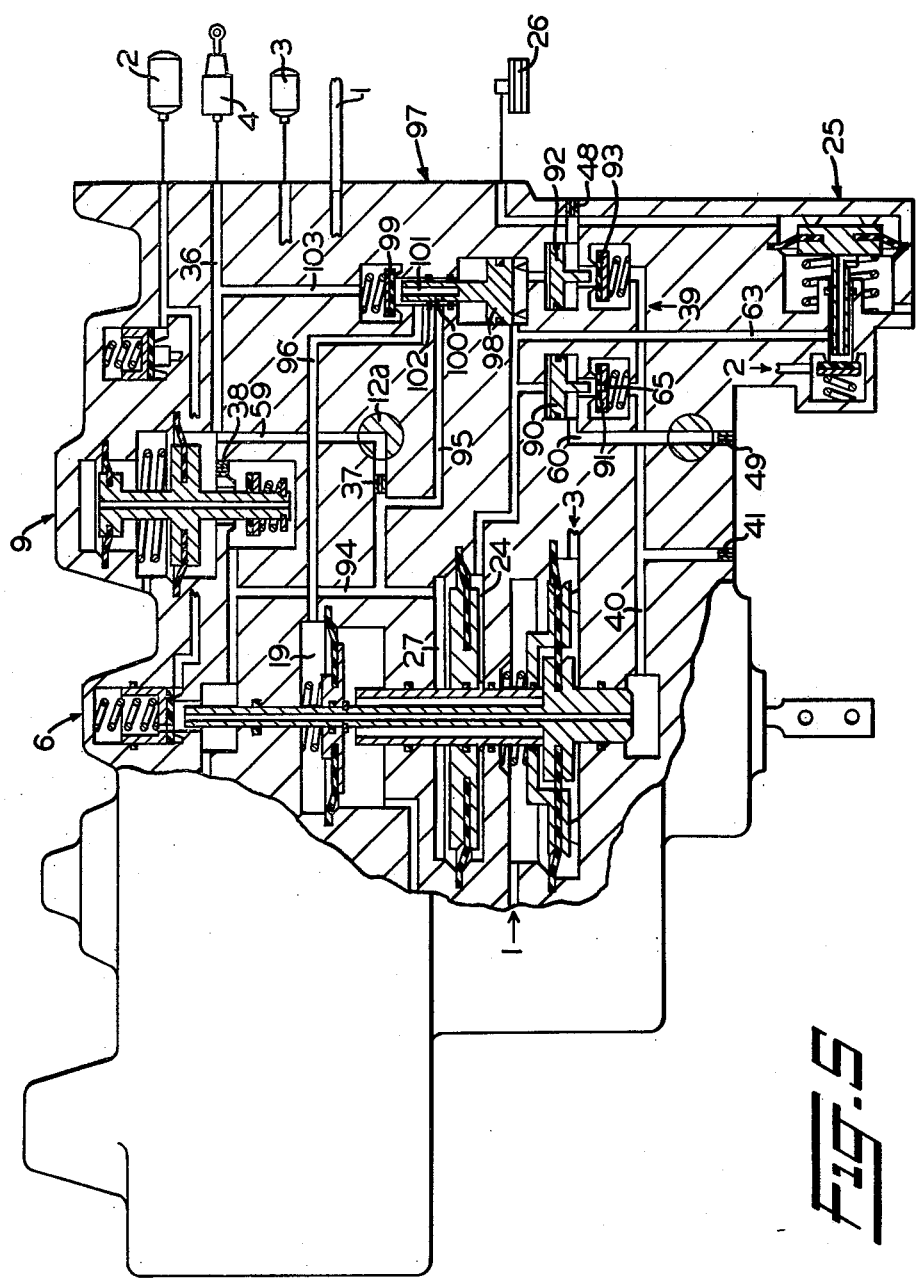
FIG. 5 is a partial diagrammatic of the distributor showing a variant of the brake release control device and an additional valve for controlling the brake pressure development according to the assumed parameter.

FIG. 5 shows schematically a variant of the pneumatic braking distributor according to this invention. In this distributor, the release-control device 39 consists of a piston 90 controlling a valve 91 that controls an exhaust conduit containing choke 49, with valve 91 in turn containing choke 65. Component 39 also includes a piston 92 controlling a valve 93 that controls an exhaust conduit containing choke 48.

It is understood that the elements 90 to 93 are substituted for piston 44 and the double valve 42, 43 described previously.

The upper faces of the two pistons 90 and 92 are acted upon:
 (a) when the vehicle is empty, by the atmospheric pressure, and
 (b) when the vehicle is loaded, by the pressure of auxiliary reservoir 2,
this pressure being transmitted via conduit 63 starting at valve 25, which can be switched by the pressure of the weighing component 26. The lower face of pistons 90 and 92 is subject to atmospheric pressure.

Chamber 27 continues to be supplied directly by the pressure from control valve device 6 via conduit 94. Conduit 59, containing choke 37 and cock 12a is branched onto conduit 94 for the purpose of being connected to conduit 36 downstream of valve 9 in the direction of the supply to cylinders 4.

To conduit 94 (or to conduit 59 upstream of 37) there is connected a conduit 95, which is joined to or isolated from conduit 96 by means of switch valve 97. Conduit 96 opens into reaction chamber 19, and valve 97 consists of a piston 98 controlling a valve 99 and is fitted with a tubular extension for controlling the aforesaid valve. The tubular extension is composed of a lateral passage 100 and an axial pressure 101, and the lateral passage works in conjunction with an O-ring 102 in such a way as to open connection 95-96 in the lower position and to close it in the raised position.

A return spring restores piston 98 to its lower, rest position. It should be added that valve 99 controls the connection between conduit 96 and a conduit 103 branched onto conduit 36 downstream of inshot valve 9.

With an empty vehicle, valve 97 permits a normal supply to chamber 19 from conduit 95, and for this purpose the path taken by the compressed air supplied by the pressure reducer is via 94, 95, 100, 101, 96.

With a loaded vehicle, valve 25 is actuated under the effect of the pressure furnished by the weighing component 26 and it transmits the pressure of the auxiliary reservoir to passage 63. Thus piston 98 is pushed upward cutting the connection 95-96 while the opening of valve 99 opens the connection 103-96.

The result is that the air supplied by control valve device 6 arrives at the main reaction chamber 19 by taking the following course: choke 37 and/or 38, conduit 103, open valve 99, conduit 96. Consequently, the reaction on the piston assembly takes place more slowly under load, which permits the desired supply times to be obtained via only two chokes.

Numerous variants of the present invention easily accessible to the expert in this field can be imagined. Thus, the braking distributor according to the invention can furnish low-volume brake-control pressure acting on a high-volume relay valve, and the pressure supplied by the distributor or the relay valve can feed pneumatic-hydraulic pressure converters for the purpose of supplying very high pressures for hydraulic braking.

Having now described the invention, what we claim as new and desire to secure by Letters Patent, is:

1. A fluid pressure distributor for a railway vehicle including a control valve device operative responsive to the variation of fluid pressure in a brake pipe of the vehicle to control the vehicle brake pressure, said control valve device comprising:
 (a) supply valve means for admitting fluid under pressure to the vehicle brake cylinders in an open position and for interrupting the admission of fluid under pressure to the brake cylinders in a closed position; and
 (b) a piston assembly to effect operation of said valve means including:
  (i) a control piston abutment subject opposingly to the fluid pressure of a brake pipe and a control reservoir in response to which an actuating force is exerted by the differential pressure therebetween to urge said piston assembly in a first direction to operate said valve means to the open position; and
  (ii) a main reaction piston abutment and an auxiliary reaction piston abutment, each subject to the fluid under pressure admitted to the brake cylinders and independently operative responsive thereto to exert a counteracting force on said piston assembly to urge movement thereof in a direction opposite the first direction, whereby said valve means is operated to the closed position when the actuating force on said piston assembly is counterbalanced; and
 (c) control means for supplying a correction pressure to said auxiliary reaction piston abutment in opposition to the brake cylinder pressure acting thereon to vary the degree of counteracting force exerted by said reaction piston on said piston assembly and thereby modify the brake cylinder fluid pressure in accordance with a vehicle parameter to which said control means is responsive.

2. The distributor of claim 1, wherein said control valve device further comprises:
 (a) said control piston abutment includes a central shaft on which said auxiliary reaction piston abutment is axially slidable; and
 (b) a stop member on said central shaft with which said auxiliary reaction piston abutment is engageable to exert said counteracting force on said piston assembly only so long as the fluid brake cylinder pressure exceeds the correction pressure.

3. The distributor of claim 1, wherein said control means comprises a vehicle load sensing device that varies said correction pressure continuously as a function of the vehicle load condition.

4. The distributor of claim 1, wherein said control means comprises:
   (a) a vehicle load sensing device providing an output pressure corresponding to the vehicle load condition; and
   (b) an actuator to which said output pressure is connected, said actuator providing said correction pressure only after said output pressure exceeds a predetermined limit, whereby said correction pressure is provided at a predetermined constant value.

5. The apparatus as recited in claim 1, wherein said control piston abutment comprises:
   (a) a central shaft; and
   (b) a segmented piston member including:
      (i) a flange formed on said central shaft subject on one side to the control reservoir pressure to urge said control piston abutment in said first direction, the control reservoir pressure being constant;
      (ii) a differential member slidable axially on said central shaft in concentric relationship with said flange, a smaller area surface of said differential member being subject to the control reservoir pressure to urge said control piston abutment in said first direction in cooperative relationship with said flange thereof, a larger area surface of said differential member being subject to the brake pipe pressure to urge said differential member into engagement with said flange so as to exert a force on said control piston abutment in the opposite direction only until the differential pressure exceeds a certain chosen limit.

6. The apparatus as recited in claim 5, further characterized in that when said differential pressure exceeds the certain chosen limit, said control piston abutment is urged in said first direction responsive to a constant actuating force exerted by the control reservoir pressure acting on said flange.

7. The distributor as recited in claim 1, further including an inshot valve device in a first passage connecting the vehicle brake cylinders with said supply valve means in parallel with a second passage, said inshot valve device comprising:
   (a) valve means for controlling the opening and closing of the first passage;
   (b) differential piston means for urging said valve means in a direction to open the first passage in response to fluid pressure therein acting on a smaller area of said differential piston means, and for urging said valve means in a direction to close the first passage in response to fluid pressure therein acting on a larger area of said differential piston means; and
   (c) bias means for urging said piston means in a direction to cause said valve means to open said first passage until the force on said differential piston is sufficient to overcome said bias means to cause said valve means to close said first passage and thereby restrict the flow of fluid pressure to said brake cylinders via the second passage.

8. The distributor of claim 7, further characterized in that the second passage includes a fluid flow restrictor calibrated to establish the restriction of fluid pressure flow to the brake cylinders via the second passage.

9. The distributor of claim 7, further comprising a fluid pressure actuator having a first inlet subject to fluid pressure in the first passage upstream of said inshot valve device, a second inlet subject to fluid pressure in the first passage downstream of said inshot valve, an outlet connected to said main reaction piston abutment and a control port subject to said correction pressure so as to connect the upstream fluid pressure to the outlet in the absence of the correction pressure and to connect the downstream fluid pressure to the outlet in the presence of the correction pressure, there being a third passage in parallel with the first and second passage in bypass of said inshot valve having a fluid flow restrictor and a cutout cock therein.

10. The distributor of claim 1, further comprising:
    (a) said control valve device further including exhaust valve means for releasing fluid under pressure from the brake cylinders in an open position thereof and for interrupting the release of fluid pressure from the brake cylinders in a closed position; and
    (b) release control means downstream of said exhaust valve means for controlling the rate of fluid brake pressure released via said exhaust valve means.

11. The distributor of claim 10, wherein said release control means comprises:
    (a) valve means in a first exhaust passage in parallel with a second exhaust passage; and
    (b) at least one fluid pressure actuator subject opposingly to the correction pressure and the brake cylinder pressure for operating said valve means such as to open the first exhaust passage in response to a preponderance of the correction pressure and to close the first exhaust passage in response to a preponderance of the brake cylinder pressure.

12. The distributor of claim 11, further characterized in that said at least one fluid pressure actuator is provided with a spring acting thereon to urge said valve means to effect opening of said first passage in the absence of the correction pressure and in response to the brake cylinder pressure being less than a predetermined value.

13. The distributor of claim 11, further comprising vehicle load sensing means for establishing the presence of said correction pressure only when the vehicle load exceeds a certain chosen value.

* * * * *